US012693466B2

(12) United States Patent
Dopfer

(10) Patent No.: US 12,693,466 B2
(45) Date of Patent: Jul. 28, 2026

(54) LIGHT GUIDE ELEMENT FOR DISPLAY BOARDS

(71) Applicant: Bremicker Verkehrstechnik GmbH, Weilheim i. OB (DE)

(72) Inventor: Herbert Dopfer, Peissenberg (DE)

(73) Assignee: Bremicker Verkehrstechnik GmbH, Weilheim i. OB (DE)

( * ) Notice: Subject to any disclaimer, the term of this patent is extended or adjusted under 35 U.S.C. 154(b) by 0 days.

(21) Appl. No.: 19/176,822

(22) Filed: Apr. 11, 2025

(65) Prior Publication Data

US 2025/0321371 A1     Oct. 16, 2025

(51) Int. Cl.
    *F21V 8/00*          (2006.01)
(52) U.S. Cl.
    CPC .................................. *G02B 6/0008* (2013.01)
(58) Field of Classification Search
    CPC .................. G02B 6/0008; G09F 9/305; G09F 2009/3055; G92B 6/0008
    See application file for complete search history.

(56) References Cited

U.S. PATENT DOCUMENTS

| | | | | | |
|---|---|---|---|---|---|
| 5,636,057 | A | * | 6/1997 | Dick .................... | G02B 3/0056 |
| | | | | | 359/625 |
| 12,046,160 | B1 | * | 7/2024 | Antonio, Jr. .......... | G06F 1/1626 |
| 2006/0050530 | A1 | | 3/2006 | Stefanov et al. | |
| 2006/0225327 | A1 | * | 10/2006 | Peters .................... | G09F 9/305 |
| | | | | | 40/547 |

| | | | | |
|---|---|---|---|---|
| 2008/0259641 | A1 | | 10/2008 | Suzuki et al. |
| 2013/0258700 | A1 | * | 10/2013 | Schuch .................. G09F 9/305 |
| | | | | 362/555 |
| 2019/0299846 | A1 | | 10/2019 | Chingyo et al. |

FOREIGN PATENT DOCUMENTS

| | | | | | |
|---|---|---|---|---|---|
| CN | 106504654 | A | * | 3/2017 | .............. G02B 3/00 |
| DE | 10062103 | A1 | | 7/2002 | |
| DE | 10231326 | A1 | | 2/2004 | |
| DE | 102004042125 | A1 | | 3/2006 | |
| DE | 102012112125 | A1 | | 6/2014 | |
| DE | 102015218158 | A1 | | 3/2016 | |
| EP | 1593109 | B1 | * | 4/2009 | .............. G09F 9/33 |
| EP | 2642542 | A1 | | 9/2013 | |
| EP | 2643717 | B1 | | 1/2022 | |
| KR | 101970654 | B1 | * | 4/2019 | ............... E01F 9/20 |
| WO | 2012068603 | A1 | | 5/2012 | |
| WO | WO-2017012664 | A1 | * | 1/2017 | ......... G02B 19/0014 |

(Continued)

OTHER PUBLICATIONS

"Electrical Safety Testing Laboratory", accessed at https://www.itcindia.org/en-12966-testing/#:~:text=This%20European%20Standard%20provides%20specifications%20for%20two%20types,are%20used%20to%20demonstrate%20compliance%20with%20the%20requirements. on Nov. 6, 2025 (Year: 2025).*

(Continued)

*Primary Examiner* — Erin Kryukova
(74) *Attorney, Agent, or Firm* — NIXON & VANDERHYE

(57)          ABSTRACT

A light guide element (100) for display boards, comprising a light guide rod (101) for introducing light from a light source (103); and a free-form lens (105) for emitting the light from the light guide rod (101) as a diverging bundle of rays (107).

14 Claims, 12 Drawing Sheets

(56)       References Cited

FOREIGN PATENT DOCUMENTS

| WO | WO-2020228109 A1 | * | 11/2020 | ............... | G09F 9/33 |
| WO | WO-2021175348 A1 | * | 9/2021 | ........... | G02B 6/0078 |

OTHER PUBLICATIONS

Office Action, issued in German Patent Application No. 102024110253.5 dated Jan. 14, 2025.
Office Action, issued in European Patent Application No. 25169705 dated Aug. 22, 2025.
Office Action, issued in German Patent Application No. 10 2024 110 253.5 dated Jan. 30, 2026.

* cited by examiner

100

105

111

101

133

LIGHT GUIDE ELEMENT FOR DISPLAY BOARDS

CROSS-REFERENCE TO RELATED APPLICATION

This application claims priority to German patent application No. DE 10 2024 110 253.5 filed Apr. 12, 2024, the entire contents of which are hereby incorporated by reference.

DESCRIPTION

The present invention relates to a light guide element for display boards, a plate comprising a light guide element, a display board comprising a light guide element and a method of emitting light by means of a light guide element.

The technical task of the present invention is to improve the perceptibility of display boards.

This technical task is solved by subject matter according to the independent claims. Technically advantageous embodiments are the subject matter of the dependent claims, the description and the drawings.

According to a first aspect, the technical task is solved by a light guide element for display boards, comprising a light guide rod for introducing light from a light source; and a free-form lens for emitting the light from the light guide rod as a diverging bundle of rays. The divergence angle of the bundle of rays is, for example, between 1° and 5°, between 1° and 10°, between 2° and 5°, or between 2° and 10°. However, in predetermined angular ranges, the free-form lens can also emit an additional parallel bundle of rays. The light guide element achieves the technical advantage that the display board can be perceived in a larger region.

In a technically advantageous embodiment of the light guide element, the cross-section and/or the cross-sectional area of the light guide rod changes continuously over the length of the light guide rod. This achieves the technical advantage, for example, that the direction of propagation of the light along the main axis can be changed within the light guide rod.

In a further technically advantageous embodiment of the light guide element, the light guide rod and the free-form lens are configured in one piece. This achieves the technical advantage, for example, that the light guide element can be installed easily.

In a further technically advantageous embodiment of the light guide element, the light guide rod has a length which is at least a multiple of the length or width of the light entry surface. For example, the length of the light guide rod is at least three times the length or width of the light entry surface. This achieves the technical advantage, for example, of achieving good mixing of the light.

In a further technically advantageous embodiment of the light guide element, the shape of the free-form lens deviates from the shape of an optical converging lens. This achieves the technical advantage, for example, that the diverging bundle of rays can be generated efficiently.

In a further technically advantageous embodiment of the light guide element, the shape of the free-form lens is configured such that it generates a collimated bundle of rays in a first angular range and a divergent bundle of rays in a second angular range. The shape of the free-form lens is non-rotationally symmetrical and/or has a continuous surface. This achieves the technical advantage, for example, that parts of the bundle or rays are collimated while others are emitted divergently.

In a further technically advantageous embodiment of the light guide element, the light guide rod has a circumferentially edge-free side surface. This also achieves the technical advantage, for example, of achieving good mixing of the light.

In a further technically advantageous embodiment of the light guide element, a light entry surface of the light guide rod is provided with a vertical structuring or a line polish. This also achieves the technical advantage, for example, that the incoming light is dispersed in a horizontal direction in order to achieve homogenization of the light distribution.

In a further technically advantageous embodiment of the light guide element, the light guide element is integrated in a plate. This also achieves the technical advantage, for example, that the mounting of the light guide element can be improved.

In a further technically advantageous embodiment of the light guide element, the axis of the light guide rod and the axis of the free-form lens are offset parallel to each other. This also achieves the technical advantage, for example, that the bundle of rays can be deflected in a predetermined direction beyond the axis of the free-form lens.

In a further technically advantageous embodiment of the light guide element, the light guide element is formed from transparent plastic. This also achieves the technical advantage, for example, that the light guide element can be manufactured easily.

According to a second aspect, the technical task is solved by a plate with a matrix-shaped arrangement of light guide elements according to the first aspect. This achieves the same technical advantages as the light guide element according to the first aspect.

According to a third aspect, the technical task is solved by a display board comprising a light guide element according to the first aspect or a plate according to the second aspect. This achieves the same technical advantages as the light guide element according to the first aspect.

In a technically advantageous embodiment of the display board, the light guide element is arranged in such a way in the display board that the diverging bundle of rays is directed downwards relative to the axis of the free-form lens. This also achieves the technical advantage, for example, that the light is efficiently directed only into the predetermined angular range in which this is desired.

According to a fourth aspect, the technical task is solved by a method of emitting light by means of a light guide element for a display board, comprising the steps of introducing light from a light source into a light guide rod; and emitting the light from the light guide rod through a free-form lens as a diverging bundle of rays. This achieves the same technical advantages as the light guide element according to the first aspect.

Exemplary embodiments of the invention are shown in the drawings and are described in more detail below, in which.

Figure 1:
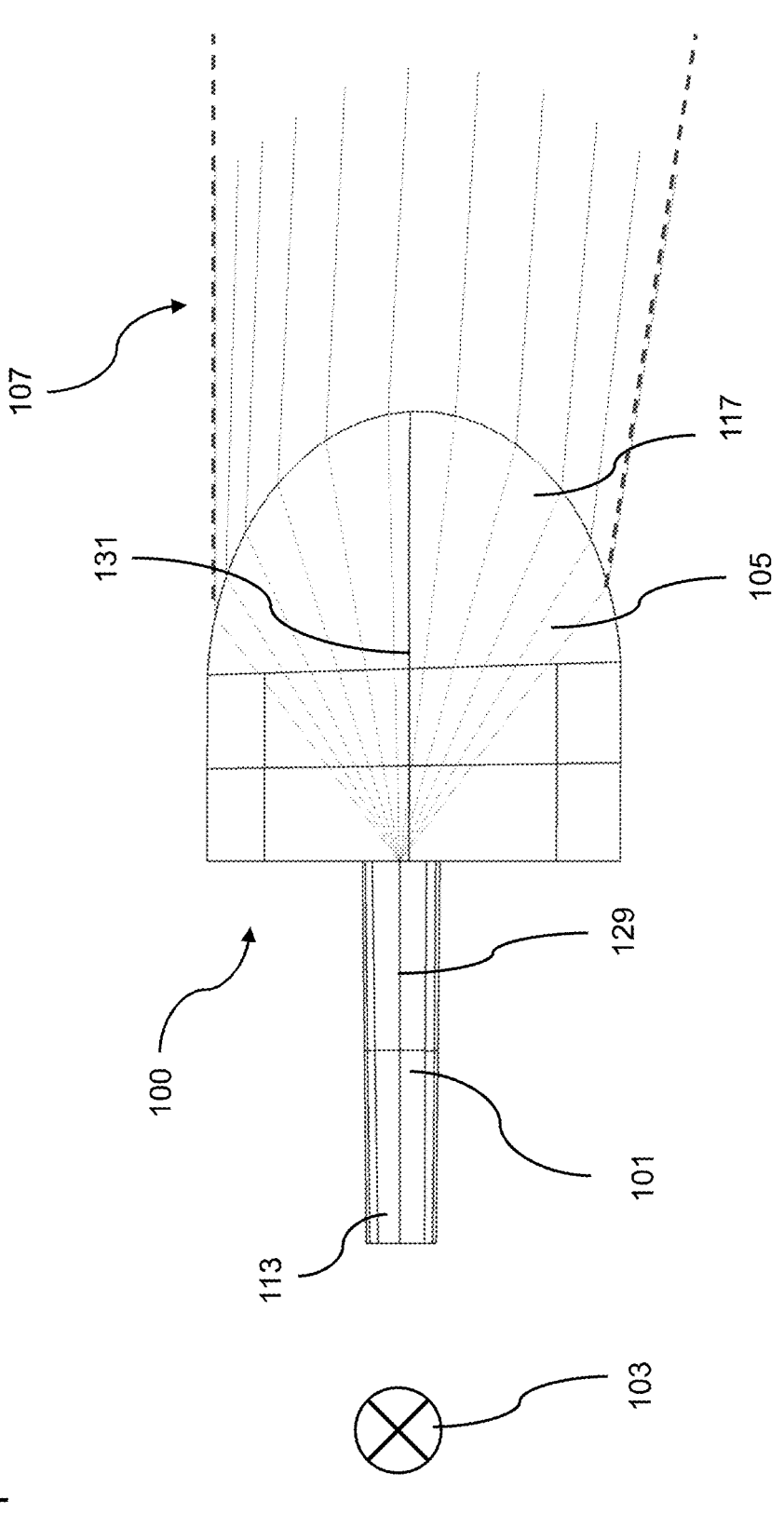
FIG. 1 shows a view of a light guide element for a display board.

FIG. 1 shows a light guide element 100 for display boards, for example for road traffic. The light guide element 100 comprises a light guide rod 101 for introducing light from a light source 103 and a free-form lens 105 for emitting the light from the light guide rod 101 as a diverging bundle of rays 107. The diverging bundle of rays 107 comprises a number of rays of light which diverge slightly but are still directed together in the same direction. The divergence angle of the bundle of rays 107 is, for example, larger than 1°, larger than 2°, larger than 3°, larger than 4°, or larger than 5°. The divergence angle of the bundle of rays 107 is, for example, smaller than 5°, smaller than 10°, smaller than 20°, or smaller than 30°. In subregions, the light of the bundle of rays 107 can also be parallel or collimated. The light guide element 100 is formed, for example, from polycarbonate or another suitable transparent material.

The light source 103 comprises, for example, an LED light source 103 that comprises several LED elements for the colors red, green and blue, such as a full-color or multi-LED. A light entry surface 111 of the light guide element 100 is arranged in front of the light source 103 and captures light from the light source 103. The emitted light from the light source 103 is introduced into the light guide rod 101.

The light guide rod 101 extends perpendicular to the light entry surface 111. A cross-section of the light guide rod 101 is constant or changes along its length gradually. For example, the cross-section of the light guide rod 101 becomes larger towards the free-form lens 105 as it progresses from the light source 103. As a result, the angle of the light can be flattened in the course of the light guide rod 101.

The side surfaces 113 of the light guide rod 101 are formed from optically reflective or polished surfaces that reflect the incident light back into the interior of the light guide rod 101 by means of total internal reflection. The side surfaces 113 do not adjoin each other with sharp edges and in a rounded manner and can be twisted. The side surfaces 113 merge into one another without forming edges. The radius of curvature between two adjoining side surfaces 113 is, for example, between 0.1 mm and 0.5 mm, preferably between 0.2 mm and 0.4 mm The material of the light guide rod 101 is transparent and free of light-scattering components. The length of the light guide rod 101 is, for example, 10 mm, the width of the light entry surface of the light guide rod 101 is, for example, 3.2 mm and its height is, for example, 1.8 mm.

The free-form lens 105 comprises a convex section 117. The axis 129 of the light guide rod 101 and the axis 131 of the free-form lens 105 are offset parallel to each other, so that the bundle of rays 107 can be deflected from the central axis 131 of the free-form lens 105. The focus of the free-form lens 105 is located, for example, 0.1 mm below the axis of the light guide rod 101. The free-form lens 105 has a complex non-rotationally symmetrical surface. The shape of the free-form lens 105 deviates from rotational symmetry.

Figure 2:
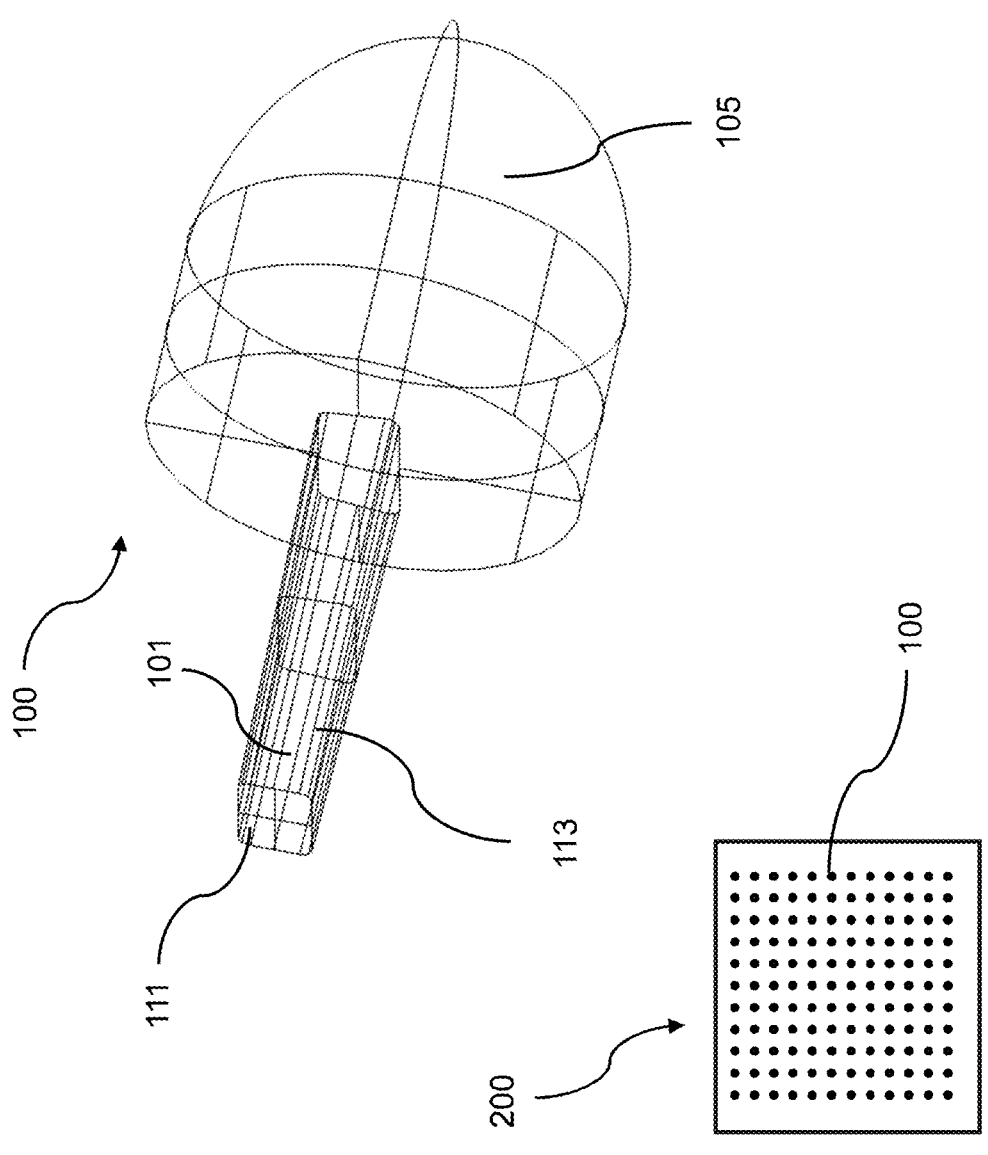
FIG. 2 shows a further view of a light guide element for a display board.

FIG. 2 shows a further view of the light guide element 100 for a display board 200. The display board 200 is, for example, a display board 200 for road traffic and comprises a plurality of light guide elements 100 in a matrix arrangement, each of which is located in front of correspondingly arranged light sources 103. The light guide elements 100 of the display board 200 emit light directed downwards relative to a horizontal direction.

Figure 3:
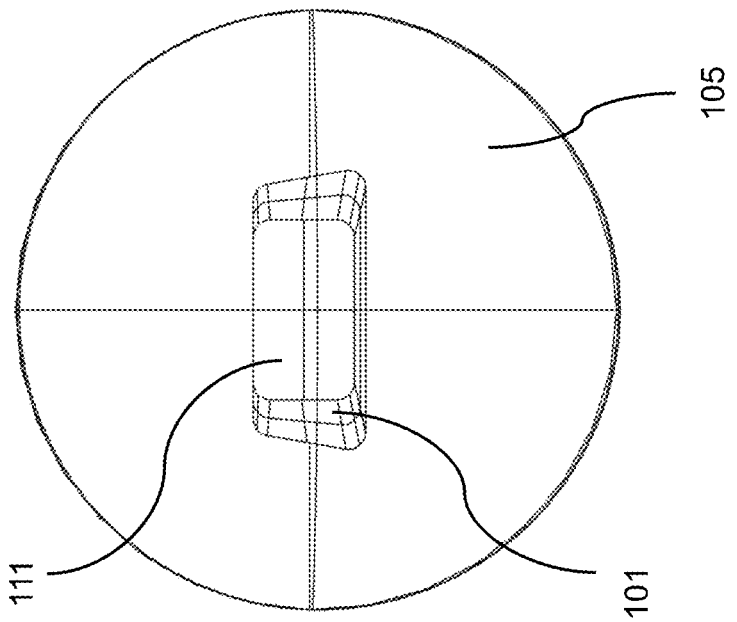
FIG. 3 shows a top view of the light guide element for a display board.
Figure 3:

FIG. 3 shows a top view of the light guide element 100 for a display board 200. The cross-section of the light guide rod 101 largely corresponds in its outline to the point-mirrored outline of the required light distribution. In the case shown, the cross-section of the light guide rod 101 is substantially trapezoidal. The light passing through the light guide rod 101 is emitted in mirrored form according to the optical law of refraction by the downstream free-form lens 105, so that the design of the free-form lens 105 can also influence the emitted appearance.

The free-form lens 105 does not bundle the light, which runs in the center point of the light guide rod 101, parallel to the axis but generates a partially diverging bundle of rays 107. The divergence angle represents the opening angle of the bundle of rays. The divergence angle is, for example, between 1° and 5° with a continuous transition. Light that runs to the side of the center point is bundled in an associated direction partially parallel, but not parallel to the axis of the light guide rod.

The light guide rod 101 and the free-form lens 105 are formed from the same material in one piece, so that there is no light entry or exit surface between them.

Figure 4:
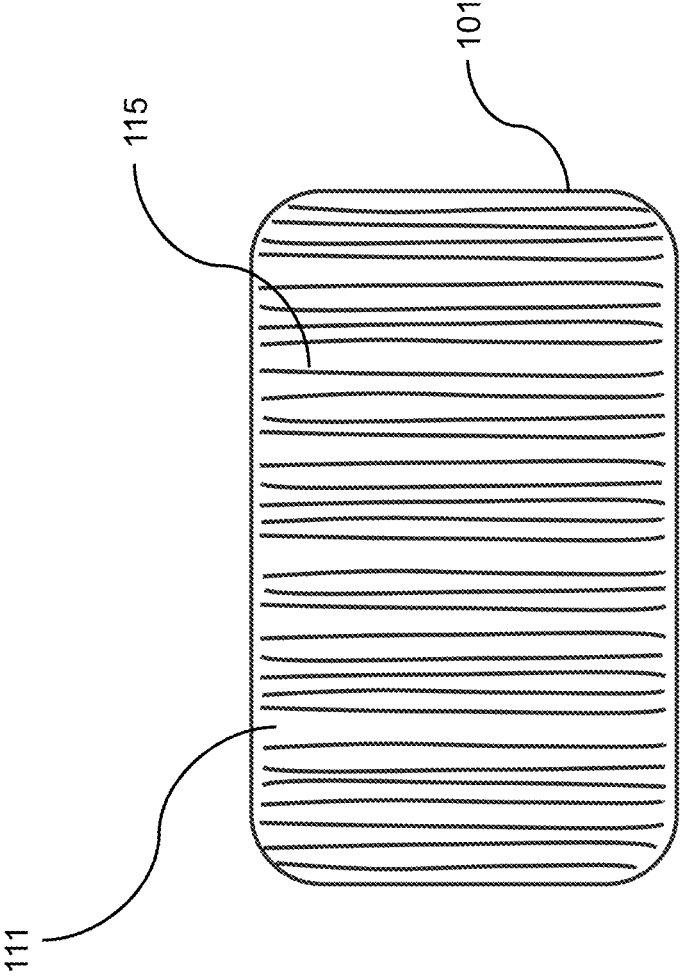
FIG. 4 shows a view of a light entry surface of the light guide rod.

FIG. 4 shows a light entry surface 111 of the light guide rod 101. The light entry surface 111 has vertical structures or a vertical line polish 115 to disperse the incoming light in the horizontal direction in order to achieve better homogenization. The line polishing roughens the surface of the light entry surface 111 in the vertical direction in order to disperse the incoming light.

Figure 5:
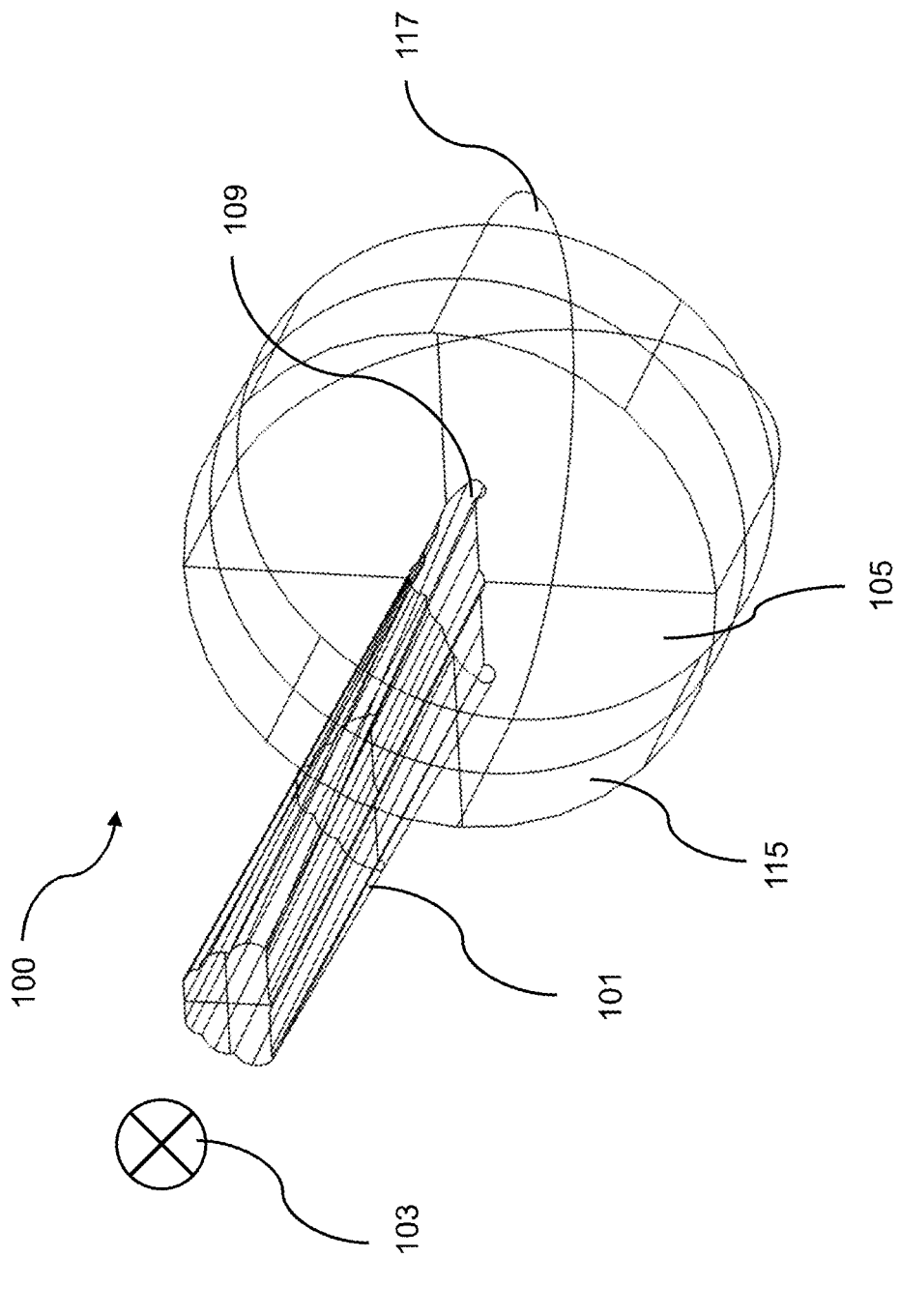
FIG. 5 shows a view of a further light guide element for a display board.
Figure 6:
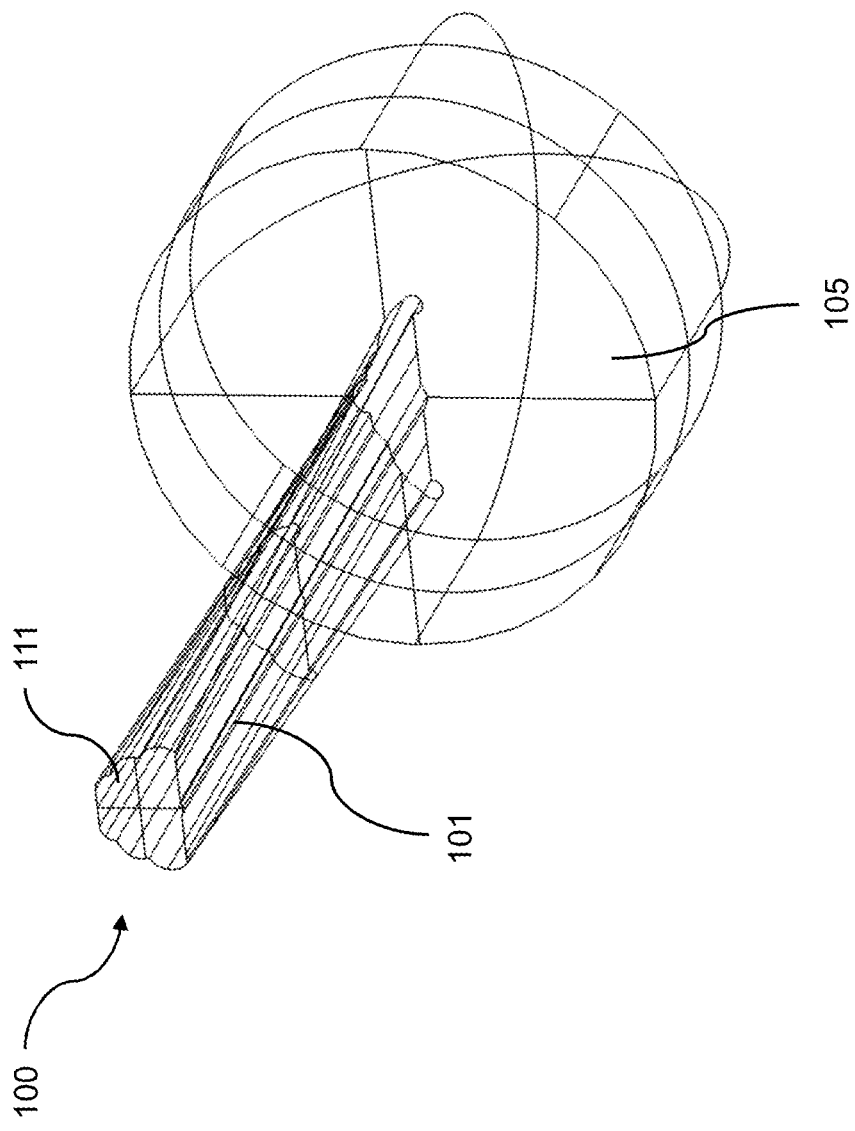
FIG. 6 shows a further view of the further light guide element for a display board.

FIGS. 5 and 6 show views of a further light guide element 100 for the display board 200. The light guide rod 101 has a side surface 113 which is rounded in cross-section. Thus, the side surfaces 113 merge into one another smoothly and do not have a sharp-edged transition. The cross-section of the light guide rod 101 changes from the light source 103 towards the free-form lens 105.

Overall, the cross-sectional area is reduced in the course of the light guide rod 101 towards the free-form lens 105. As a result, the angle of the light can be made steeper in the course of the light guide rod 101. The cross-sectional area in the region of the free-form lens has a substantially triangular shape. In addition, the cross-sectional area comprises additional convex or bulbous bulges 109 at the corners of the triangular shape, which can be used to amplify the light in the corner areas. This allows the emitted light to be homogenized over the entire area.

Figure 7:
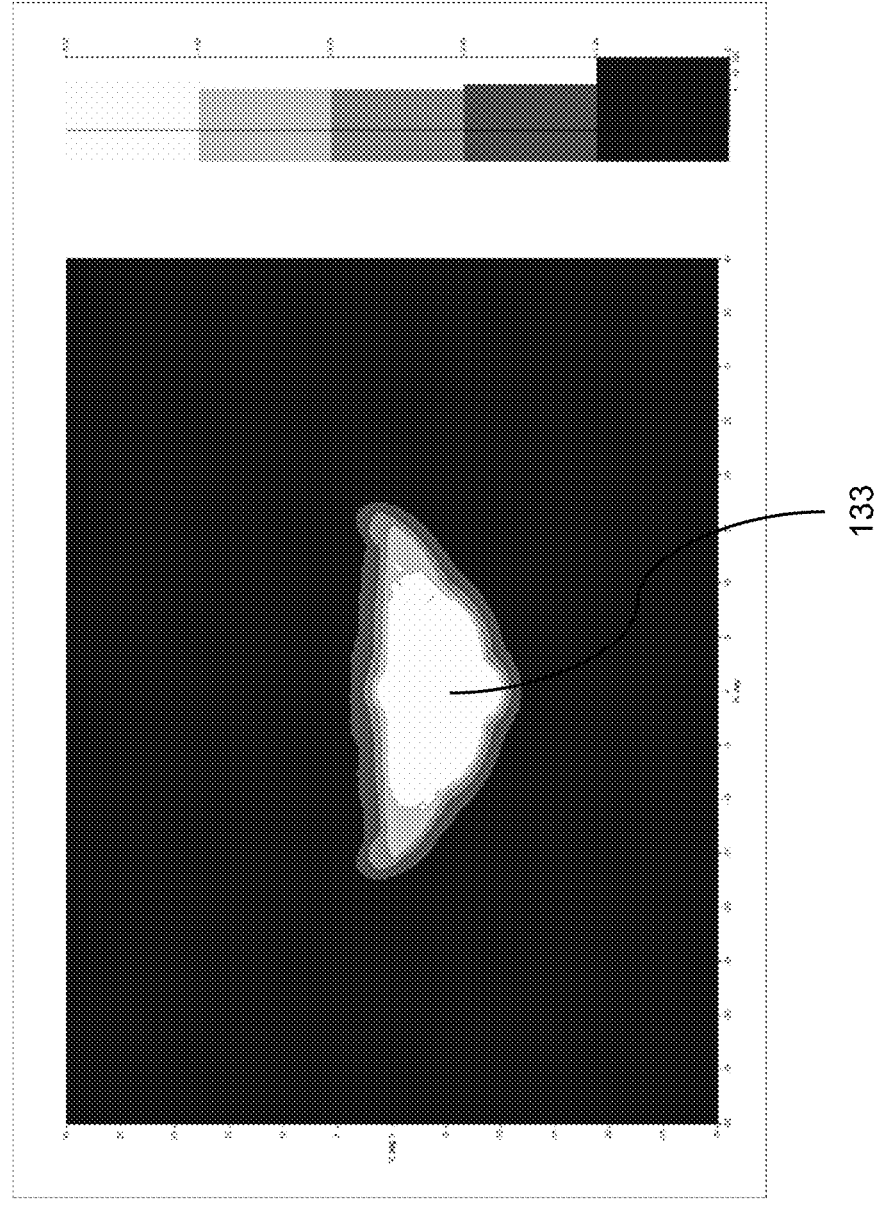
FIG. 7 shows a view of a light distribution of the further light guide element.

FIG. 7 shows a view of a light distribution 133 of the further light guide element 100. The light distribution 133 corresponds to the mirrored shape of the cross-sectional area of the light guide rod 101 in the transition to the free-form lens 105 and is largely homogeneous.

Figure 8:
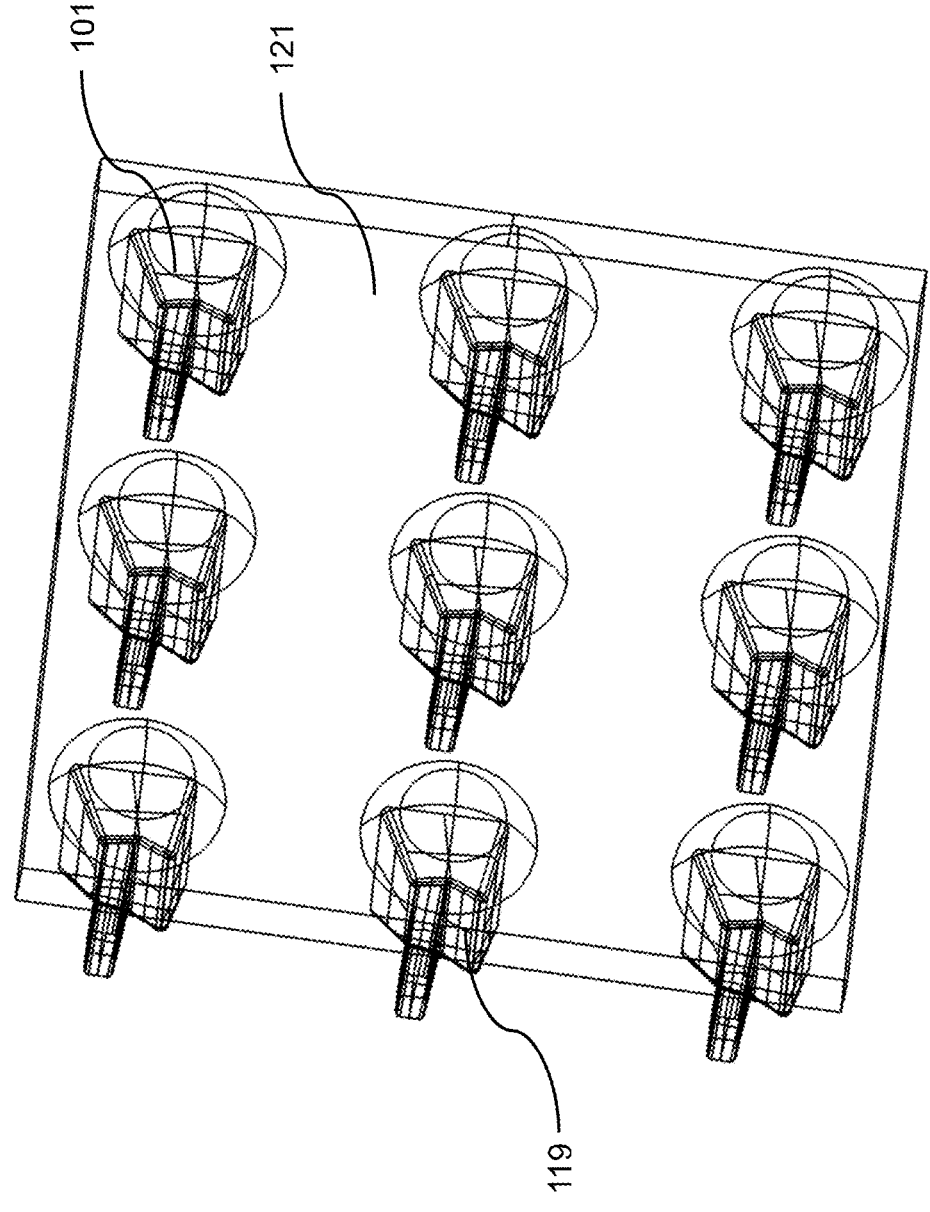
FIG. 8 shows a view of light guide elements integrated in a plate.
Figure 9:
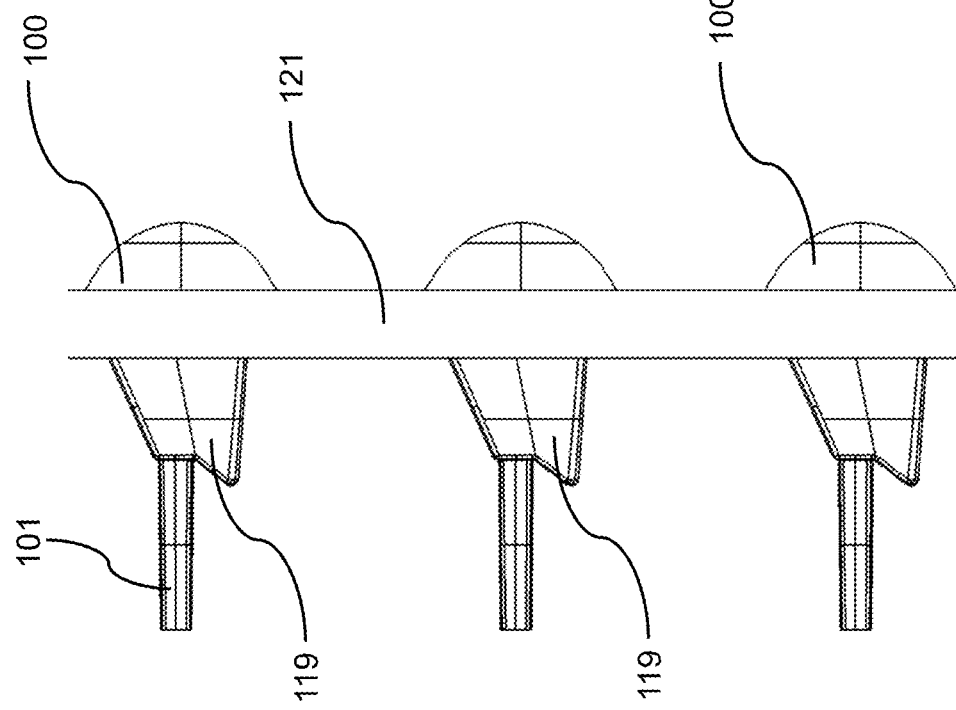
FIG. 9 shows a further view of light guide elements integrated in a plate.

FIGS. 8 and 9 show views of light guide elements 100 integrated in a transparent plate 121. The plate 121 surrounds a lateral subregion of the light guide elements 100. The light guide elements 100 are arranged in the shape of a matrix in the plate 121 and are formed together with the plate 121 in one piece. The matrix-shaped light guide elements 100 are an integral part of the plate 121 and are formed together from the same material.

Each of the light guide elements 100 additionally comprises a light trap 119, with which light incident from outside can be decoupled. The matrix-shaped arrangement of the light guide elements 100 in the plate 121 eliminates the need for time-consuming plug-in work when assembling the display board 200.

The flat plate 121 has, for example, a thickness of between 3 mm and 5 mm, preferably 4 mm, and is arranged or integrated between the light trap 119 and the free-form lens 105. The plate 121 and the light guide element 100 are formed from transparent plastic, for example.

Figure 10:
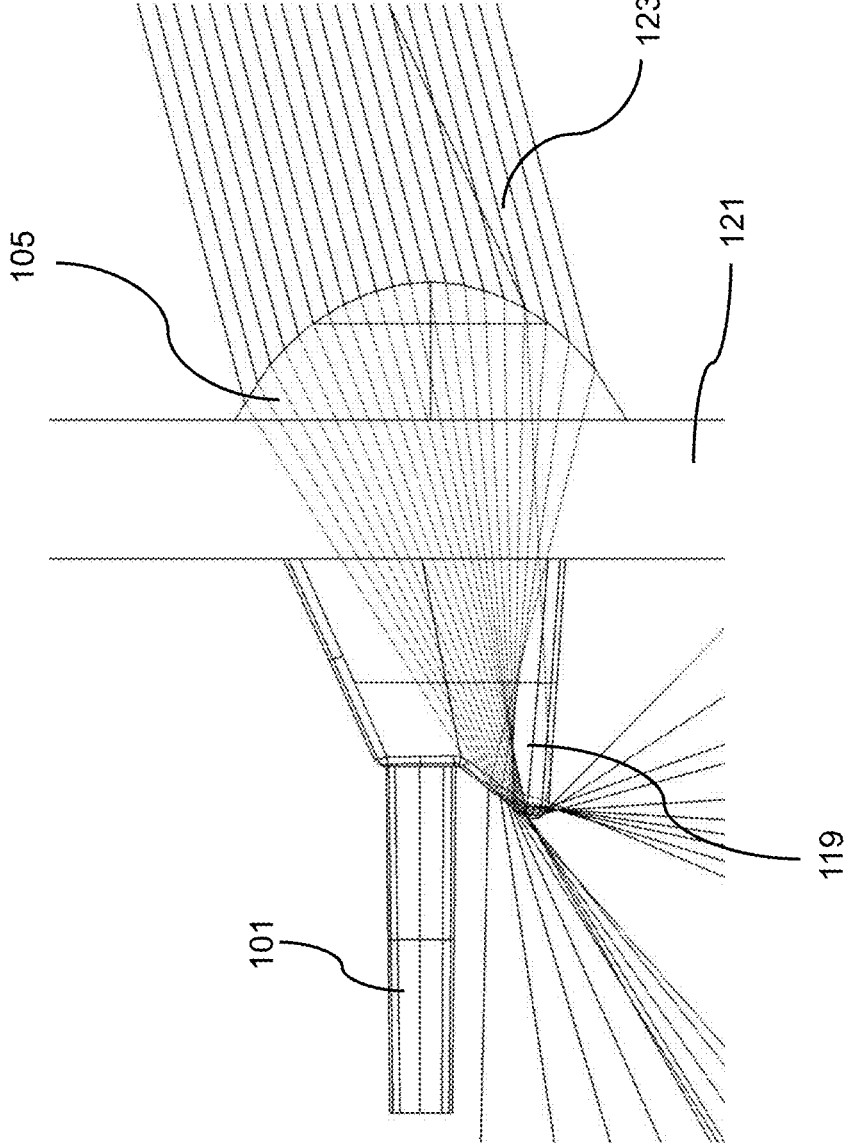
FIG. 10 shows a view of a beam path in the light guide element with a light trap.
Figure 11:
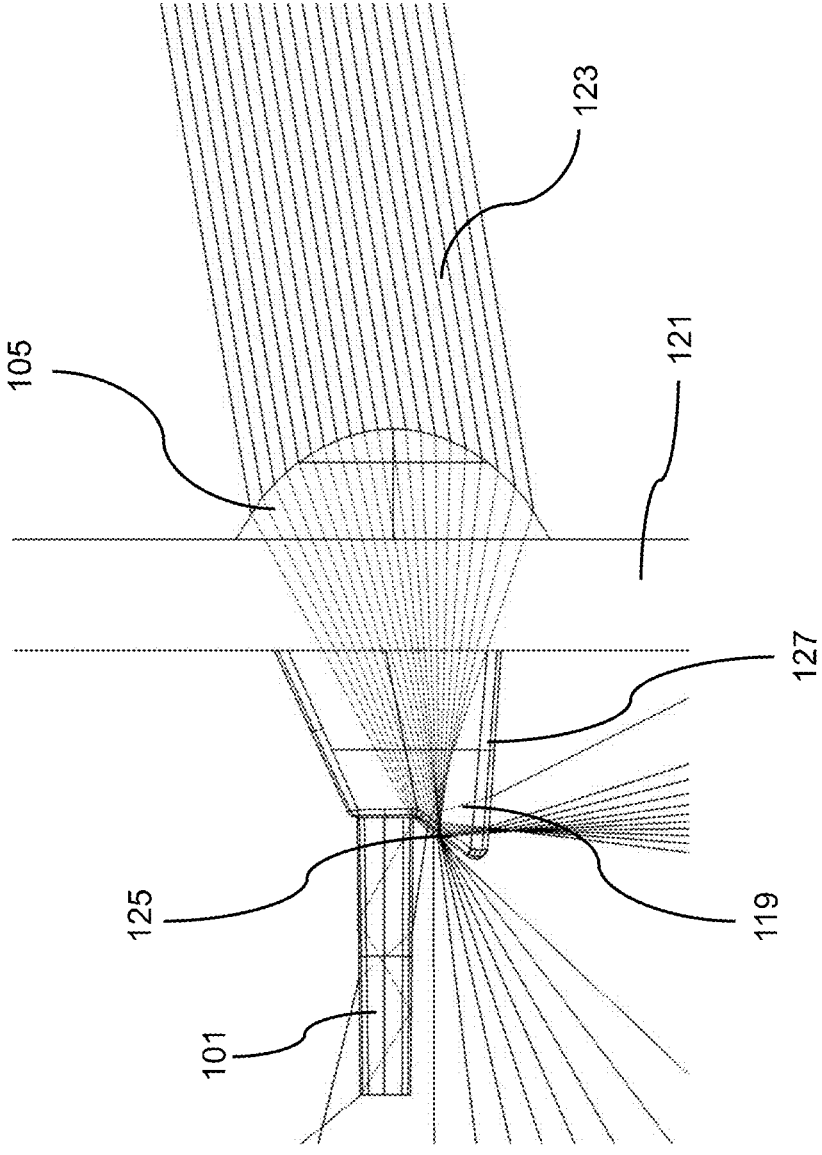
FIG. 11 shows a view of a beam path in the light guide element with the light trap.

FIGS. 10 and 11 show views of a beam path in a light guide element 100 with the light trap 119. The light trap 119 decouples light 123 incident from outside from the light guide element 100, such as sunlight from a low sun. The light trap 119 is formed by a section triangular in cross-section, which is located between the free-form lens 105 and the light guide rod 101. The light trap 119 comprises two light exit surfaces 125 and 127, with which the incident light 123 is decoupled from the light guide 100. The light exit surfaces 125 and 127 are arranged at an acute angle to each other. The light trap 119 widens in the direction of the free-form lens 105.

The light trap 119 serves to avoid a focal spot on the material surface and to disperse the incident light in order to avoid high concentrations of light. It also prevents flat extraneous light from being coupled into the light guide rod 101, for example to prevent phantom lights when the sun is low in the sky. The contrast is increased in a switched-off state.

Figure 12:
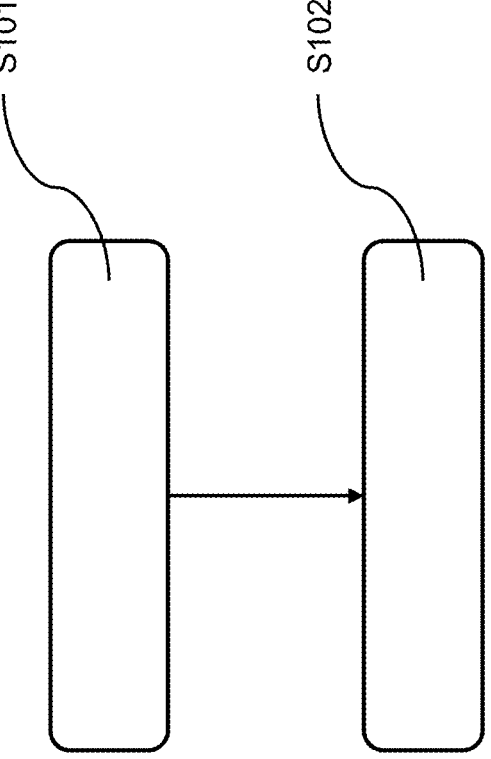
FIG. 12 shows a block diagram of a method of emitting light by means of a light guide element for a display board.

FIG. 12 shows a block diagram of a method of emitting light by means of a light guide element 100 for a display board 200. The display board 200 is used, for example, for alternating displays of traffic signs on roads or bridges.

The method comprises the step S101 of introducing light from the light source 103 into the light guide rod 101. In step S102, the light is emitted from the light guide rod 101 through a free-form lens 105 as a diverging bundle of rays 107.

All the features explained and shown in connection with individual embodiments of the invention can be provided in different combinations in the subject matter according to the invention in order to simultaneously realize their advantageous effects.

All method steps can be implemented by devices that are suitable for executing the respective method step. All functions performed by features of the subject matter can be a method step of a method.

The scope of protection of the present invention is given by the claims and is not limited by the features explained in the description or shown in the figures.

REFERENCE LIST

100 Light guide element
101 Light guide rod
103 Light source
105 Free-form lens
107 Bundle of rays
109 Bulge
111 Light entry surface
113 Side surface
115 Line polish

117 Convex section
119 Light trap
121 Plate
123 Incident light
125 Light exit surface
127 Light exit surface
129 Axis
131 Axis
133 Light distribution
200 Display board

The invention claimed is:

1. A light guide element for display boards, the light guide element comprising:
   a light guide rod configured to introduce light light source, the light guide rod having a circumferentially edge-free side surface; and
   a free-form lens configured to emit the light from the light guide rod as a diverging bundle of rays.

2. The light guide element according to claim 1, wherein one or more of the cross-section and the cross-sectional area of the light guide rod changes continuously over the length of the light guide rod.

3. The light guide element according to claim 1, wherein the light guide rod and the free-form lens are configured in one piece.

4. The light guide element according to claim 1, wherein the light guide rod has a length which is at least a multiple of the length or the width of a light entry surface of the light guide rod.

5. The light guide element according to claim 1, wherein the shape of the free-form lens deviates from the shape of an optical converging lens.

6. The light guide element according to claim 1, wherein the shape of the free-form lens is configured such that the free-form lens generates a collimated bundle of rays in a first angular range and the divergent bundle of rays in a second angular range.

7. The light guide element according to claim 1, wherein a light entry surface of the light guide rod is provided with a vertical structuring or a line polish.

8. The light guide element according to claim 1, wherein the light guide element is integrated in a plate.

9. The light guide element according to claim 1, wherein a longitudinal axis of the light guide rod and a longitudinal axis of the free-form lens are offset parallel to each other.

10. The light guide element according to claim 1, wherein the light guide element is formed from transparent plastic.

11. A plate comprising:
    a matrix-shaped arrangement of light guide elements according to claim 1.

12. A display board comprising:
    the light guide element according to claim 1 or comprising a plate comprising a matrix-shaped arrangement of light guide elements according to claim 1.

13. The display board according to claim 12, wherein the light guide element is disposed in the display board such that the diverging bundle of rays is directed downwards relative to the longitudinal axis of the free-form lens.

14. A method of emitting light by a light guide element for a display board, the method comprising:
    introducing light from a light source into a light guide rod, the light guide rod having a circumferentially edge-free side surface; and
    emitting the light from the light guide rod through a free-form lens as a diverging bundle of rays.

* * * * *